No. 792,643. PATENTED JUNE 20, 1905.
J. B. WORD.
MACHINE FOR MAKING AND SHARPENING DRILLS.
APPLICATION FILED SEPT. 3, 1902.

6 SHEETS—SHEET 1.

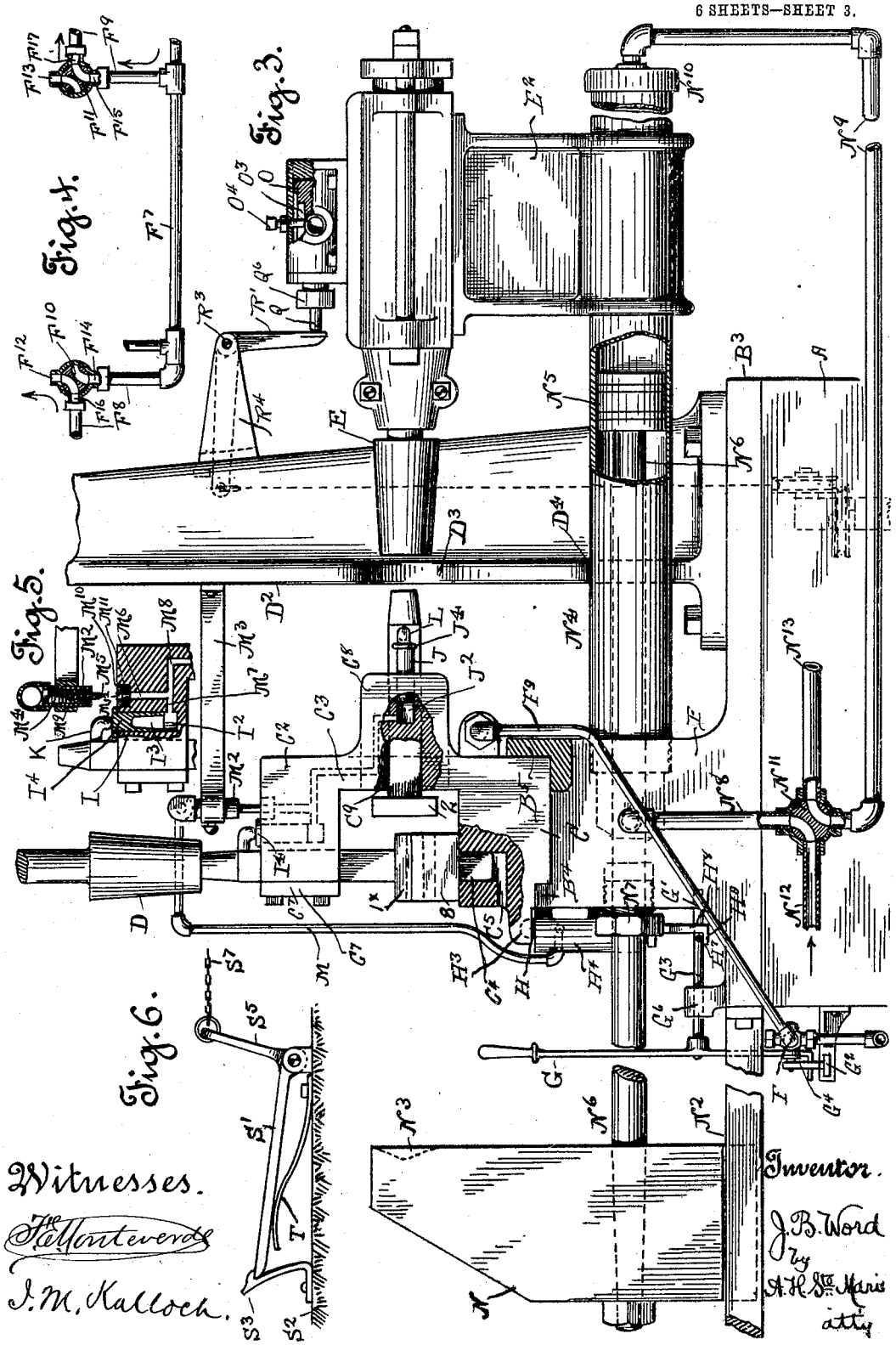

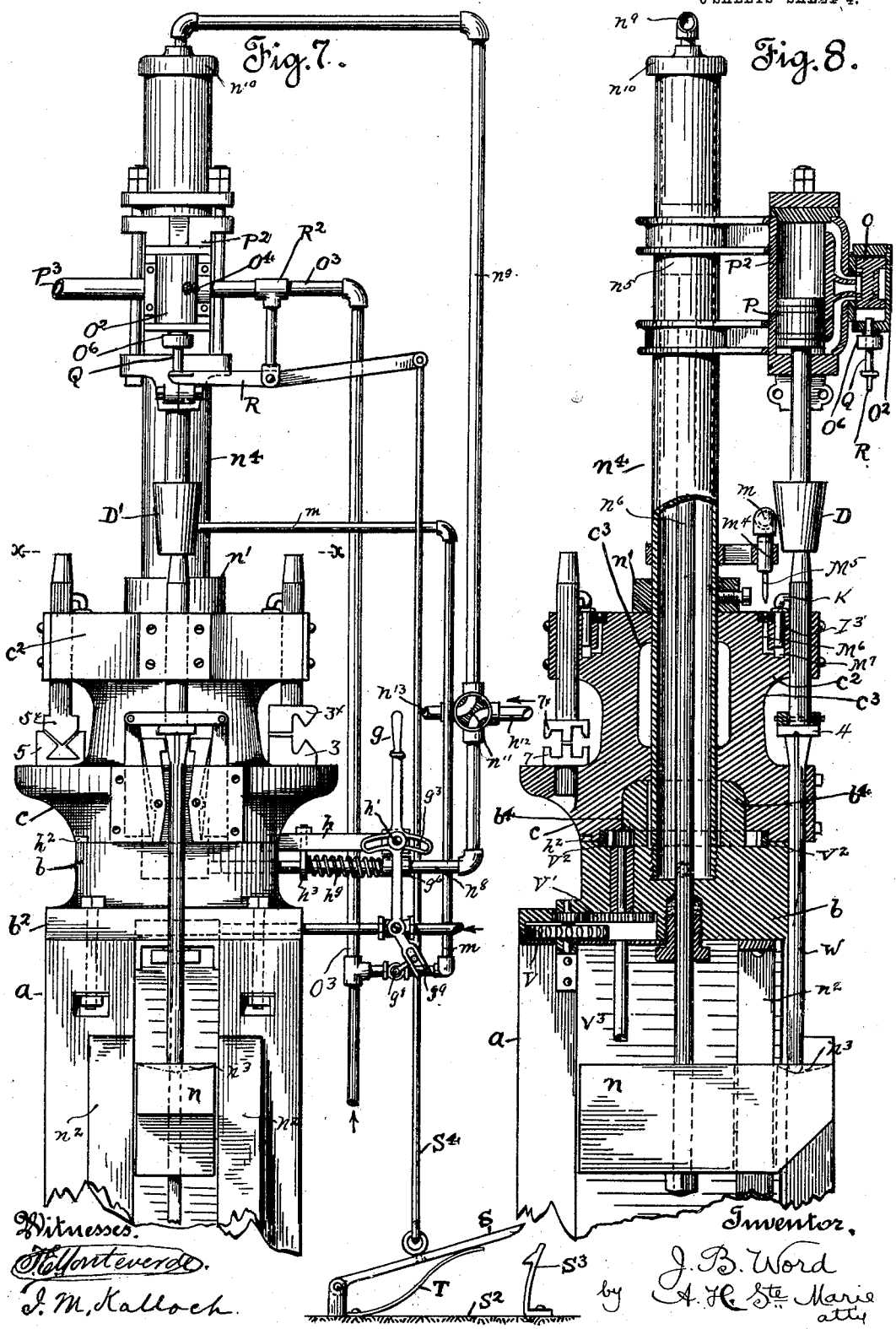

No. 792,643. PATENTED JUNE 20, 1905.
J. B. WORD.
MACHINE FOR MAKING AND SHARPENING DRILLS.
APPLICATION FILED SEPT. 3, 1902.
6 SHEETS—SHEET 5.
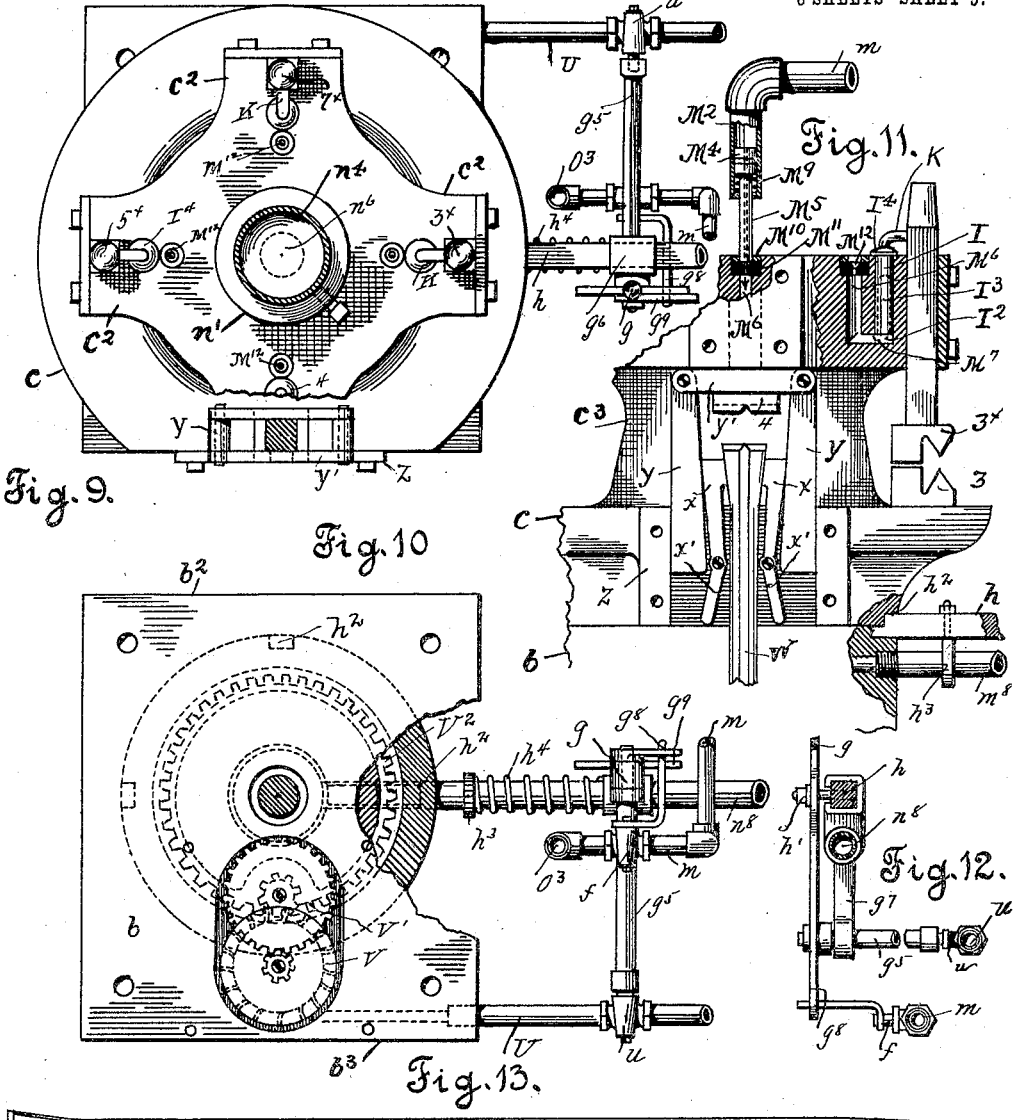
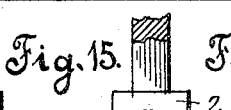
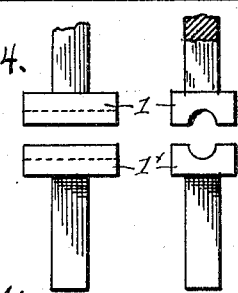
Witnesses.
Louis C. Christie.
J. M. Kalloch.
Inventor.
J. B. Word
by A. H. Ste Marie
atty

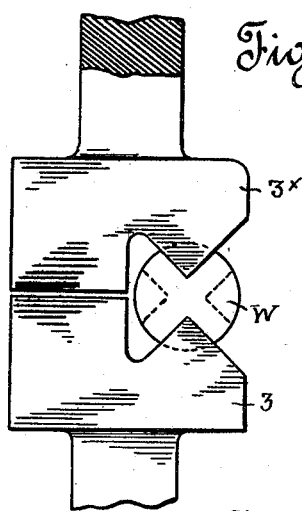
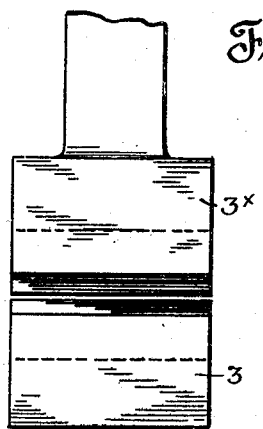
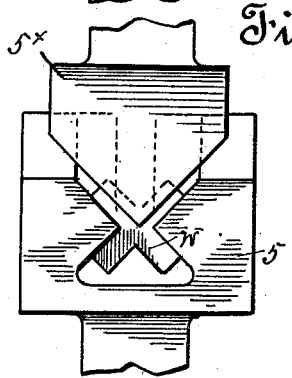
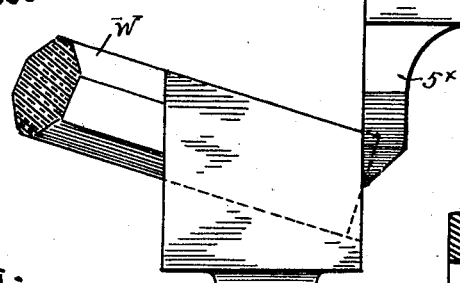
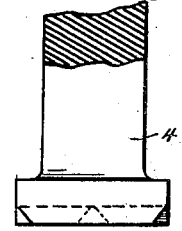
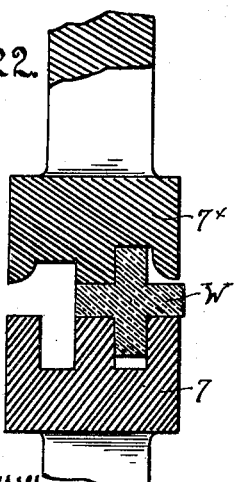
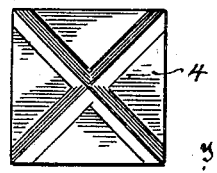
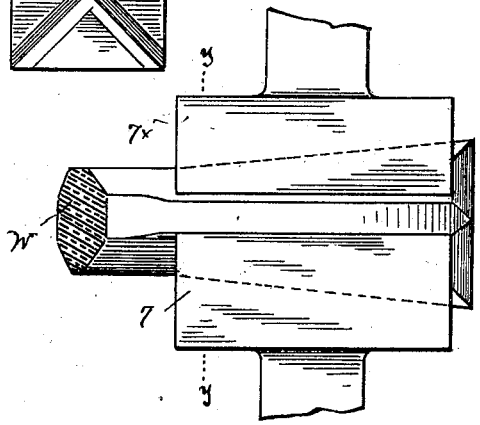

No. 792,643.  
Patented June 20, 1905.

UNITED STATES PATENT OFFICE.

JOHN B. WORD, OF SOULSBYVILLE, CALIFORNIA, ASSIGNOR, BY DIRECT AND MESNE ASSIGNMENTS, TO WORD MANUFACTURING COMPANY, A CORPORATION OF ARIZONA TERRITORY.

MACHINE FOR MAKING AND SHARPENING DRILLS.

SPECIFICATION forming part of Letters Patent No. 792,643, dated June 20, 1905.

Application filed September 3, 1902. Serial No. 122,007.

*To all whom it may concern:*

Be it known that I, JOHN BUCHANAN WORD, a citizen of the United States of America, and a resident of Soulsbyville, in the county of Tuolumne and State of California, have invented certain new and useful Improvements in Machines for Making and Sharpening Drills, of which the following is a specification.

This invention relates to the manufacture, keeping in order, and repairing of percussive drills and kindred tools, such as are used in mining, tunneling, quarrying, and other work of that nature.

The object of this invention is to provide means for economically executing by machinery what has hitherto commonly been effected by costly skilled manual labor in the above-mentioned line of work.

Figure 1:
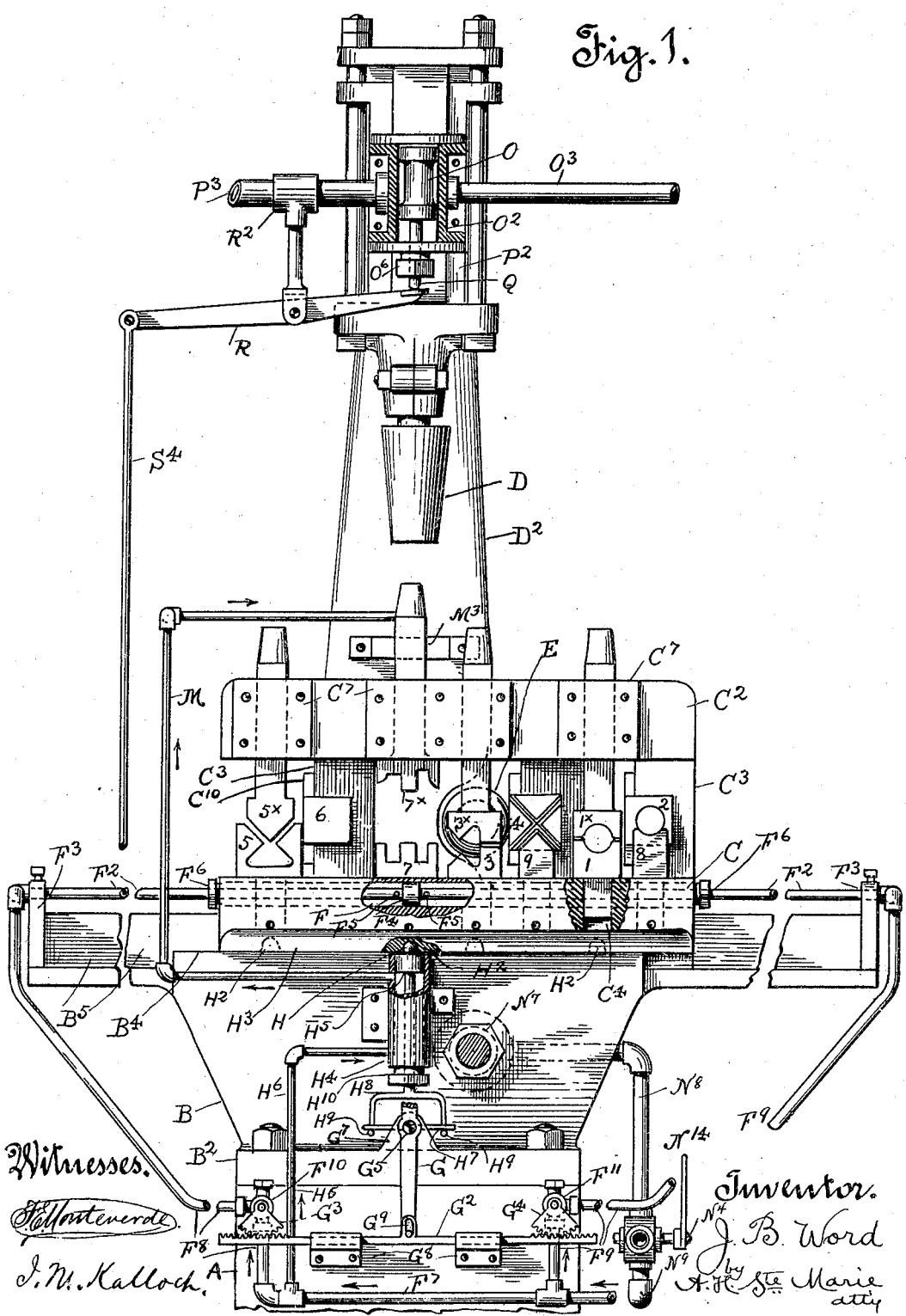
Figure 2:
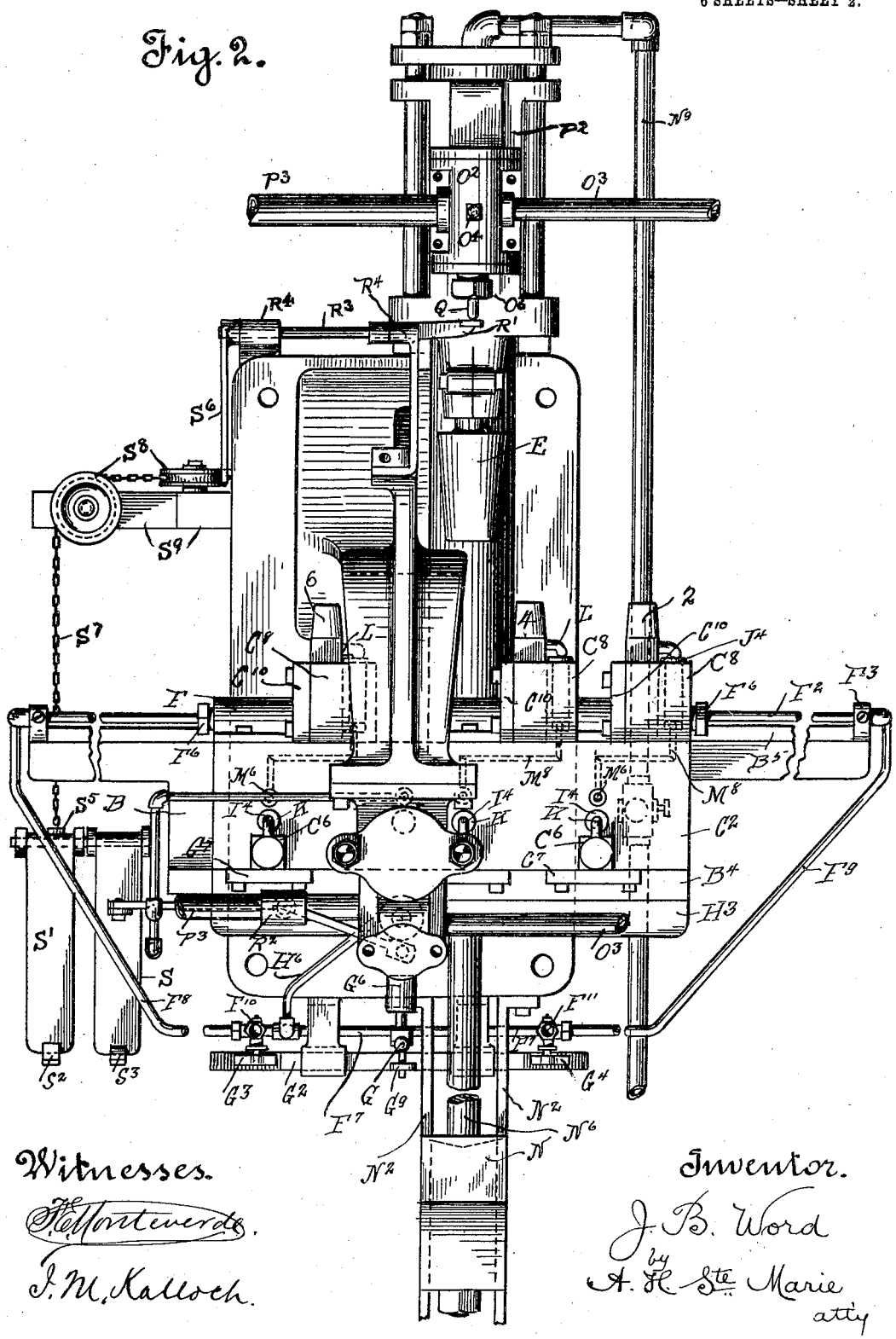

Referring to the drawings, Figure 1 is a front elevation of one form of my improved machine, partially broken and partially in section. Fig. 2 is a top view of the same. Fig. 3 is a partly broken and partly sectional side elevation looking from the right of both said Figs. 1 and 2. Fig. 4 is a detailed view of certain valves that are indistinctly shown in the lower part of Fig. 1. Fig. 5 is also a detail illustrative of a certain fluid-pressure contrivance embodied and adjacently located in Fig. 3. Fig. 6 is a side elevation of a treadle used in connection with the same form of my machine. Fig. 7 is a partly broken left side elevation of a machine of modified form. Fig. 8 is a vertical section through Fig. 7, exposing to view the interior construction of the right half thereof, which is the forward part of the machine. Fig. 9 is a sectional plan taken on the line $x \, x$ of the said Fig. 7 looking down. Fig. 10 is a similar plan looking up from the bottom of the same Fig. 7, the base or stand of the machine being removed. Figs. 11 and 12 are detailed views of certain parts of the said modified form of my machine. Fig. 13 shows a well-known species of drill which either form of machine aforesaid will properly make, sharpen, or repair. Figs. 14 to 25, inclusive, are detailed views of the dies or metal-forging tools that are ordinarily and interchangeably employed in the two forms of my machine here illustrated.

The form of my machine first above mentioned rests on a base A, which, as shown in Figs. 1 and 3, is preferably rectangular in shape and laid with its longer sides running from front to rear. This base is conveniently made of wood and set in the ground where the machine is to be used. Seated upon the forward end of the said base transversely thereof is an anvil-block B, provided at its bottom, front, and rear with two horizontally-disposed outwardly-extending flanges $B^2 \, B^3$. (Best seen in Fig. 2.) The flanges $B^2 \, B^3$ entirely cover the base A and afford means for bolting thereto the said anvil-block B. The latter, with its fastening-flanges, is a solid iron casting, rather oblong and made with upwardly-flaring ends that rise above and extend beyond the sides of the said base. It has a depressed top, margined by horizontally-running vertically-turned flanges $B^4 \, B^5$ at its upper front and rear edges, which forms a bearing and guideway for a movable anvil C located thereon. Together the said base A and anvil-block B constitute the mount or support for the said anvil C. This construction of base and anvil-block is suitable, but, nevertheless, susceptible of change. My invention therefore is not limited to the same. It contemplates the use of any satisfactory foundation that will hold up the anvil C, whatever its individual height may be, at the right elevation for the work to be done thereon and which will afford the necessary facilities for the said anvil to move as intended for the purpose to be presently explained.

The aforesaid anvil C is designed to carry a number of blacksmiths' tools—such as 1 and $1^\times$, 2, 3, and $3^\times$, 4, 5, and $5^\times$, 6, 7, and $7^\times$—all of which are seen in Fig. 1. The tools here shown are, I believe, all those necessary or useful for the manufacture, mending, or sharpening of a drill of the cruciate variety and include pairs of dies for shaping both the shank and bit of the drill laterally by striking them on opposite sides and single dies for fashioning the two extremities of bit and shank by end blows. Conjunctly with these two kinds of dies or tools I find it convenient to use two hammers—namely, a vertical hammer D and a horizontal hammer E—which are respectively located so as to strike one above and the other back of the anvil C. The said hammers are power-driven, and of course have their permanent places in front of the smith or operator as he stands before the anvil-block B; hence the expediency of moving the anvil C thereon in order to shift its dies or tools, and thus bring any single one or any pair desired among them under or in line with its or their respective hammer, as the work may require, without removing them from their sockets or settings. The bottom of the anvil C is therefore recessed in and adapted to slide upon the surface of the anvil-block B, above referred to as being depressed, which depressed surface it is made to fill between the marginal flanges $B^4 B^5$. As seen in Figs. 1 and 2, the rear flange $B^5$ of the anvil-block B is extended outwardly at both ends and shaped so as to provide an auxiliary support for the outgoing end of the anvil C at its bottom when it is moved either to the right or to the left with relation to the hammers D E. To exemplify this, I have shown the said anvil slightly moved to the right in these two figures. As further seen in the same Figs. 1 and 2 and in Fig. 3, the anvil C is formed with a shelf $C^2$, supported from its rear by brackets $C^3$. The purpose of this construction is to facilitate the application and operation of the several dies or tools carried by the anvil. Thus, on the one hand, the paired or double dies or tools, which herein are marked $1\ 1^\times$, $3\ 3^\times$, $5\ 5^\times$, $7\ 7^\times$, are better placed under and worked with the vertical hammer D. For this reason they are arranged as bottom and top tools and in line along the front edge of the anvil C and its shelf $C^2$. The bottom tools, respectively numbered 1, 3, 5, and 7, have their shanks inserted in sockets $C^4$ of the anvil C, Fig. 1, which sockets are duly provided at their lower ends with forwardly-running discharge or cleaning holes $C^5$ for dust or dross. The top tools, which are $1^\times$, $3^\times$, $5^\times$, and $7^\times$, have their shanks recessed in the shelf $C^2$, as at $C^6$, Fig. 2, and covered by small plates $C^7$, fastened to the said shelf, as shown in the same figure and also in Figs. 1 and 3. The shanks of these several top and bottom tools and the sockets therefor, it will be observed, are properly squared or otherwise suitably formed to prevent rotation or lateral displacement of the tools composing each pair. On the other hand, the single tools or dies (designated by the numerals 2, 4, and 6) are easily positioned in a level plane and conveniently operated with the horizontal hammer E at the rear of the anvil C. Therefore they are given their bearings in the brackets $C^3$ and rear extensions or bosses $C^8$ thereof, in one side of which their shanks are recessed, as at $C^9$, similarly to the top tools and likewise covered by small plates $C^{10}$, secured to the said brackets and bosses or extensions, as illustrated in the said Figs. 1, 2, and 3. These single tools, it is understood, are loosely held in their said bearings, face inward, and are properly located to alternate with some of the aforesaid double tools at regular intervals apart. The alternation of the said tools need not be unbroken, as Fig. 1 shows. It is sufficient for gaining an advantageous workable arrangement to have them in suits or series comprising each a single tool and a double tool, which suits or series can be grouped or isolated or transposed, as may be found desirable. In the arrangement represented in Fig. 1 single tool 2 is placed at the extreme right, immediately preceded on the left by double tool $1\ 1^\times$. Single tool 4 comes next, with double tool $3\ 3^\times$ at its left. Double tool $5\ 5^\times$ is at the extreme left, with single tool 6 on its right, and double tool $7\ 7^\times$ intervenes solitarily between $3\ 3^\times$ and 6. Although the sequence is not uninterrupted, it will be noticed that the double tool is at the left and the single tool at the right in each suit or series. The hammers D and E are correspondingly located, D on the left and E on the right at a distance one from the other equivalent to the interval between the double and single tools of each suit or series aforesaid, the distance and interval being measured from center to center, as if on a straight horizontal line laterally. Consequently, assuming the alternation of the said tools is correctly maintained and the spacing to be uniform, each time the double tool in a suit or series will be brought directly under the vertical hammer D the single tool in the same suit or series will lie in a straight line with the horizontal hammer E. This renders available at the same time a double tool composed of a pair of vertically-working dies and a single tool consisting of one horizontally-working die, each operated with its own hammer. The particular office or function of each one of the tools or dies above enumerated will be described hereinafter.

Power to move the anvil C in either direction within its slideway on the anvil-block B is supplied as follows in the form of my invention represented by Figs. 1, 2, and 3: A cylinder F for compressed air is securely attached to the rear side of the said anvil above and parallel with the rear flange $B^5$ of the said anvil-block. This cylinder is sleeved over a horizontal air-pipe $F^2$, which is held up and firmly positioned in brackets $F^3$, rising perpendicularly from the said flange $B^5$. The pipe $F^2$ has welded on it a disk $F^4$, snugly fitting the bore of the said cylinder and forming a sort of stationary piston-head therein. When the anvil C is entirely on the block B, the said disk $F^4$, which is centrally located on the pipe $F^2$, occupies also a central position in the cylinder F. Perforations $F^5$ are provided in the pipe $F^2$ on each side of its said disk, and both ends of the cylinder F are fitted with stuffing-boxes and glands $F^6$ $F^6$ around the said pipe beyond these perforations, so that a suitable charge of air can be forced into either cylinder end and will be properly retained in the same. Now it is manifest that the compressed air, as it expands against the disk $F^4$ and in the cylinder's end into which it is directed, will cause the said cylinder F to slide along the air-pipe $F^2$ and move the anvil C upon the block B and along one end or the other of its extended flange $B^5$. The air used is supplied by an ordinary compressor, which I have not illustrated because not forming part of my machine. It will be sufficient to state that the air therefrom is conveyed to the pipe $F^2$ and through it to the cylinder F by means of a pipe $F^7$, laid close to the ground in front of the machine and having upwardly-projected branches $F^8 F^9$, that are coupled to the ends of the said pipe $F^2$ and provided with intermediate cocks or rotary valves $F^{10}$ $F^{11}$ of the four-way type, located in oppositely-turned rectangular bends of these branch pipes $F^8$ $F^9$. As shown, the branch pipe $F^8$ has the valve $F^{10}$ and connects with the left end of the pipe $F^2$, while to the right end of $F^2$ is connected the branch pipe $F^9$, possessed of the valve $F^{11}$. These valves are made to exhaust as well as to feed the air, which functions they perform by turns. Their enveloping shells or casings are therefore provided with exhaust-ports $F^{12}$ $F^{13}$, one to each, besides the usual inlets and outlets, respectively designated by $F^{14}$ $F^{15}$ and $F^{16}$ $F^{17}$. The exhaust-port is located oppositely to the inlet and disposed at a right angle with relation to the outlet in each instance. Fig. 4 illustrates the construction and working of these parts. As there indicated, the passages of the two valves $F^{10}$ and $F^{11}$ are so turned within their casings, and these valves are operated together in one direction or the other in such a way that when the right-hand valve, for instance, will allow air to pass on into the right end of the pipe $F^2$ and corresponding end of the cylinder F the left-hand valve will exhaust from the left end of F $F^2$, and vice versa. This Fig. 4 being particularly for the valves $F^{10}$ $F^{11}$ does not show the cylinder F nor the pipe $F^2$ and of course must be read in connection with Figs. 1, 2, and 3. I operate these two valves $F^{10}$ $F^{11}$ together, as said, by means of a lever G, connected with a rack $G^2$, whose ends alone are toothed and mesh into sector gears or quadrants $G^3$ $G^4$, secured to the arbors or spindles of the said valves, one quadrant to each valve. The lever G is set in a central vertical position and made to work right and left thereof in a plane parallel with the front of the machine, where it is fulcrumed as a lever of the first class on a rock-shaft $G^5$, journaled at $G^6$ $G^7$ in the lower part of the anvil-block B and upon its forward flange $B^2$. (See Figs. 1, 2, and 3.) The rack $G^2$ is arranged so as to slide horizontally with its teeth upward in brackets $G^8$ $G^8$, secured to the base A of the machine. The lower end of the lever G is connected with the central part of this rack $G^2$ by being bent outwardly and passed through an upwardly-elongated eye $G^9$, formed on the upper side of the said rack. This construction allows the lever to oscillate freely on its rock-shaft without disturbing the rectilinear movement of the rack. The sector gears or quadrants $G^3$ $G^4$ work in a vertical plane on the toothed surface of the rack $G^2$ and at rest hang down perpendicularly from their respective valve-spindles. Whenever the lever G is pushed to the right, it slides the rack $G^2$ to the left and causes the two gears $G^3$ $G^4$, with their valves $F^{10}$ $F^{11}$, to move clockwise into the position represented in Fig. 4, thereby opening the valve $F^{10}$ for exhaust and the valve $F^{11}$ for feed, with the result aforesaid that the compressed air flows into the right end of the cylinder F, wherein it impinges against the right side of the disk $F^4$ and operates to shift the said cylinder and the thereto-fastened anvil C to the right. On the contrary, if the lever G is inclined to the left the rack $G^2$ will slide to the right, and the gears $G^3$ $G^4$ and valves $F^{10}$ $F^{11}$ will then turn contra-clockwise, thus reversing or interchanging the functions of said valves, diverting the flow of compressed air to the left end of the cylinder F and against the left side of the disk $F^4$ therein, and consequently operating to move the said cylinder F and anvil C to the left. When the lever G is returned to its median position, its idle one, both valves $F^{10}$ $F^{11}$ are shut to the supply of compressed air.

I provide a stop H to arrest and retain the movable anvil C at the proper place on the block B, so that the tool or tools to be used thereon shall be always correctly situated with respect to the hammers D and E, or either of them. The said stop consists of a vertically-acting pin adapted to engage any one of a line of holes $H^2$ in the under side of a forward flange or additional member $H^3$ of the anvil C, near the bottom thereof, which flange or additional member is made to project horizontally over the front vertical flange $B^4$ of the anvil-block B, as seen in Figs. 1, 2, and 3. The holes $H^2$ are spaced, preferably, with reference to the tools that come under the vertical hammer D in such a way that every time the stop-pin H will enter one of these holes there will be a pair of the before-mentioned vertically-working tools or the place therefor beneath the said vertical hammer. Necessarily there are as many holes $H^2$ as there are pairs of these tools, but none need be provided for the adjacent horizontally-working tools, since, as before said, the latter alternate with the former regularly where they occur and the two hammers D E are conformably distanced and related. To bring any one of the horizontally-working tools opposite the hammer E simply requires stopping the next preceding vertically-working tool on the left under the hammer D. However, this arrangement could be reversed by spacing the holes $H^2$ relatively to the horizontal hammer E or a number of such holes equal to that of the tools on the movable anvil C, and more could be provided for the stop-pin H thereof, if desired. I have only endeavored to show the simplest construction in this particular.

It is desirable that the stop-pin H be mechanically withdrawn when the anvil C is about to be moved, also that it should automatically engage the proper hole $H^2$ after the said anvil has brought the desired tool to the hammer to be employed, D or E, and, further, that its withdrawal and insertion be so timed as to coincide respectively and harmoniously with the application and disconnection of the power used for shifting the anvil, all to the end that the functions of the said stop-pin be discharged with preciseness and without unnecessarily dividing the attention of the operator of the machine. I therefore have conceived the idea of retracting the stop-pin H by the same lever G, before described, that applies the power to shift the said anvil C and of utilizing part of this same power to bring about the reëngagement of the said stop-pin when the said lever is released, its interconnection with the stop-pin causing the lever to return to its normal upright position and operating to cut off the impulsive force acting upon the anvil. To carry out this idea, I place the stop-pin H in a small open-ended air-cylinder $H^4$, secured to the upper front part of the anvil-block B, preferably opposite or in the same central vertical plane as the hammer D. I similarly dispose the holes $H^2$ of the anvil-flange $H^3$, one opposite each of the aforesaid double vertically-working tools, and in this way arrange to have the vertical hammer D, a double tool thereunder, and the stop-pin H, as well as the lever G, practically alined before the operator whenever the said stop-pin enters one of the said holes. (See Figs. 1 and 3.) I provide the stop-pin H near its upper end with a piston-head $H^5$, closely fitting the cylinder $H^4$, and I direct a current of compressed air against the under side of this piston-head, so that the said upper end of the stop-pin will normally project outward and engage or tend to engage one of the holes $H^2$. The compressed air is brought up by a pipe $H^6$, connecting the before-mentioned pipe $F^7$ with one side of the cylinder $H^4$ close to its lower end. As shown in Figs. 1 and 2, the pipe $H^6$ taps the pipe $F^7$ a little to the right of the branch pipe $F^8$, and thence runs upward and inward to the left side of the cylinder $H^4$. The connection whereby the lever G is enabled to pull down the stop-pin H out of the holes $H^2$, and which afterward operates to normalize the said lever through the said stop-pin, as above stated, consists of a rod $H^7$ and fork $H^8$. This rod and fork, as represented in Figs. 1 and 3, are respectively formed or secured, the former horizontally across the rock-shaft $G^5$ of the lever G, and the latter vertically on the lower end of the stop-pin H, with its tines $H^9$ outwardly turned parallel with the said rock-shaft, on opposite sides thereof. The rod $H^7$ normally lies at right angles to the tines $H^9$, above and in contact with them. The shank of the fork $H^8$ and lower end of the stop-pin H pass through a suitable stuffing-box and gland $H^{10}$, with which the bottom end of the air-cylinder $H^4$ is fitted. It will now be understood that when the lever G is swung either way to apply the compressed air to the moving of the anvil C in one direction or the other by sliding the rack $G^2$ and working the thereto-geared valves $F^{10}$ and $F^{11}$, as hereinbefore explained, the rod $H^7$ will be correspondingly oscillated by the rock-shaft $G^5$, and bearing down upon either tine $H^9$ of the fork $H^8$ will operate to draw the stop-pin H out of its hole $H^2$ against the air-pressure under the piston-head $H^5$, thereby leaving the said anvil free to slide on the block B. If the lever G is held out, the anvil C will then move to any point selected by the operator along the top of the block B and either end of its outwardly-extending flange $B^5$, the retracted stop-pin H meanwhile missing or skipping any hole $H^2$ that may happen to pass over it; but as soon as the lever G is released the air-pressure on the under side of the piston-head $H^5$ causes the stop-pin H to rise and enter the first hole $H^2$ that comes opposite, thus stopping the anvil C, normalizing the lever G through the agency of the fork $H^8$ and rod $H^7$, sliding back the rack $G^2$, connected with the said lever, closing the valves $F^{10}$ $F^{11}$, geared therewith, and cutting off the compressed air used for shifting the said anvil.

While using the several tools hereinbefore mentioned, whether singly or in pairs or in suits or series, I prefer always to hold the striking-tool away from the work before and after each blow, and I therefore provide means for so doing. By "striking-tool" is meant each single horizontal tool and the top tool in each pair of vertical tools through which the blows of the hammers D E are administered. Figs. 1 and 3 show the top tool $7^\times$ and the horizontal tool 2 thus retracted from the place usually occupied by the work, which in the case of tool $7^\times$ is naturally held on the bottom tool 7 underneath, and in the case of tool 2 is laid upon a rest 8, provided for the purpose in front thereof. This rest resembles one of the bottom tools in construction and is likewise socketed in the anvil C in line with the said bottom tools in a way to permit transposition, if deemed useful. A similar rest 9 is located in front of horizontal tool 4, and, if desired, the same provision can be made for tool 6 or any other horizontal tool that may be added or substituted. By building my machine so as to have the striking-tool off the work during the intervals that precede and follow the blows, as above stated, I manage to accomplish mechanically what the blacksmith does or can do by manipular operation, and that is to remove the scale from the work as it is being turned out. I have observed, in forging drill-bits, particularly, that better results are obtained when the scale is caused to peel and fall off the hot bit-forming steel by withdrawing or repelling the striking-tool at every impact, because the work is then cleaner and more easily finished, whereas if the tool that transmits the blows is all the time kept in close contact with the hot steel the scale will accumulate and be ground in, so to say, to the extent that the work will appear pitted and have a tendency to chill, which is productive of round or oval and dull edges on the bits. I further gain by holding the striking-tool up or away from the work between blows, as mentioned, a certain advantage or convenience in placing, removing, turning, and generally handling the work which would not be had otherwise. The means that I employ for thus repelling or holding the striking-tool up or back in alternation with the delivery of the hammer-blows is compressed air, which I supply to tool-retractors I and J, respectively, provided for the aforesaid top tools and horizontal tools, as illustrated in Figs. 2, 3, and 5. Each top tool has its retractor I, which engages a rearwardly-projecting pin K on the shank thereof, and each horizontal tool also has its retractor J, engaging a similar but laterally-projected pin L of its shank on the right. The retractors I and J are identical in construction and consist of movable plugs respectively inserted, the former in vertical holes $I^2$, drilled or formed in the top of the anvil-shelf $C^2$ behind each top tool, and the latter in horizontal holes $J^2$, similarly made in the bosses $C^8$ of the anvil-brackets $C^3$ on the right side of each horizontal tool. I make these plugs or tool-retractors shorter than the holes in which they are fitted, as well as hollow at their lower or inner ends, as shown at $I^3$ in Fig. 5, to facilitate the action of the compressed air thereon. I therefore provide them, in addition, each with a suitable head $I^4 J^4$ to prevent their sinking into their said holes, when the air is cut off, under the weight or impulse of the tools whose pins K or L they engage. These heads of the tool-retractors I J, it will be seen, afford good bearings for the pins K L and also serve to support or arrest at all times, at least partly, the tools provided with the said pins.

The compressed air is conveyed to the lower or inner ends of the above-described retractors I J whenever the tools on which they respectively operate are to be used through a pipe M, communicating at one end with the upper part of the stop-pin cylinder $H^4$, previously mentioned, and at its other end with another centrally-located vertically-disposed cylinder $M^2$, which is held up above the anvil C by an arm or bracket $M^3$, projecting horizontally and forwardly from the standard $D^2$ of the hammer D. This pipe M taps the cylinder $H^4$ on the left at a point immediately below the piston-head of the stop-pin H therein when the said piston-head is in its uppermost position, and, as represented in Figs. 1, 2, and 3, the said pipe M leads therefrom outward to the left end of the anvil-block B and thence upward and back and inward again to the upper end of the cylinder $M^2$. The latter-named cylinder incloses a centrally-perforated piston $M^4$, Fig. 5, having an axial downwardly-protruding nozzle $M^5$, which is adapted to be thrust into any one of a number of vertical holes $M^6$ made in the top of the anvil-shelf $C^2$ directly back of and corresponding with the series of retractor-holes $I^2$. A short interconnecting-passage $M^7$ joins one hole $I^2$ with one hole $M^6$ at their lower ends, behind each top tool aforesaid, throughout the two series of these holes $I^2$ and $M^6$, there being as many passages $M^7$ as there are pairs of interconnected holes, so that when compressed air is injected through the nozzle $M^5$ into a hole $M^6$ it will be led into the corresponding hole $I^2$ and by lifting the retractor I therein will operate to raise the pin K bearing on this retractor and the tool to which the same pin is attached. Other passages $M^8$ establish similar communications between the lower ends of the holes $M^6$ and the inner ends of the retractor-holes $J^2$, which holes $M^6$ and $J^2$ are thereby interconnected in pairs also and are therefore serially grouped with the retractor-holes $I^2$, through the passages $M^7$, to correspond with the suits or series of tools hereinabove mentioned, except that the hole $M^6$, which is back of tool $7^\times$, has no interconnection, but with the retractor-hole $I^2$ for the said tool $7^\times$, since the latter is not in a suit or series with any horizontal tool. Figs. 2 and 3 clearly show this arrangement in dotted lines, which arrangement manifestly makes it possible for the compressed air directed into any one of the aforesaid serially-grouped holes $M^6$ to reach both a vertical retractor I and a horizontal retractor J in their respective holes $I^2$ and $J^2$ of the same group through the connected passages $M^7 M^8$, so that when the vertical retractor will be moved up the horizontal retractor will be moved out, and the tools on which they act will be simultaneously repelled. Both these tools are then in the desired state of pneumaticity, ready for operation with the hammers D E, either of which can be brought into play, as suggested in Fig.

3, where seemingly D is down on tool $1^x$ and E stays back with tool 2 pneumatically forced out. While in this way pneumatized, whichever tool is struck by either hammer will immediately rebound after each blow, flying up or back, as it is intended it should do. Tool $7^x$ will be alone under the pneumatic influence owing to its isolation, as appears from Figs. 1 and 2.
The holes $M^6$, through which the nozzle $M^5$ delivers the compressed air that is fed to the retractors I and J for the several top tools and horizontal tools, to render the same pneumatic, are of necessity so spaced on the movable anvil C as to harmonize with the mutually-related distances before noted as existing between the tool and hammer centers, and likewise the said nozzle is necessarily so located that one of the said holes $M^6$ always is open to it after each move of the anvil wherever stopped by the pin H in order that every tool brought to either hammer may have its retractor in the right position to receive the jet or stream of compressed air. I have deemed preferable to place the cylinder $M^2$, from which this nozzle $M^5$ is operated, in the same vertical plane as the hammer D, lever G, stop-pin H, and cylinder $H^4$, and consequently to have the holes $M^6$ fall in line therewith, one after another as required, at each stoppage of the anvil C, although by removing them from view and with less convenience, perhaps, the said nozzle and the holes therefor could be arranged with relation to the horizontal hammer E or located elsewhere. The use of compressed air, it may be here noted, is also a matter of preference, as other fluid or equivalent pressure can be employed instead and applied through the same nozzle and holes to move the tool-retractors I J.
It will be observed that the admittance of the nozzle $M^5$ to the holes $M^6$ must be timed to alternate with the moving of the anvil C. This is my reason for drawing the compressed air from the cylinder $H^4$ at the highest possible point under the raised piston $H^5$ therein, as shown in Fig. 1. Obviously upon being pulled down below the pipe connection M by withdrawing the pin H to permit moving the anvil C the piston $H^5$ will cut off the compressed air theretofore supplied to the cylinder $M^2$, and no resistance will then be offered to the raising of the latter's piston $M^4$ and protruding nozzle $M^5$. The raising of the piston $M^4$ and nozzle $M^5$ is effected when the compressed air is thus cut off by a spring $M^9$, coiled around the said nozzle within the cylinder $M^2$ under its said piston $M^4$. As soon, however, as the anvil C is stopped through the rise of the piston $H^5$ in the cylinder $H^4$ and the insertion of the pin H in one of the holes $H^2$ of the anvil-flange $H^3$ the compressed air again reaches the pipe M, cylinder $M^2$, and piston $M^4$, which, compressing the spring $M^9$, thrusts out its nozzle $M^5$ into the hole $M^6$, brought underneath by the stoppage of the anvil. As the nozzle $M^5$ enters this hole $M^6$ the compressed air reaches and fills it through the said nozzle and the perforation of the piston $M^4$ sufficiently to actuate the retractor or retractors I J, which are then accessible, each by the thereto-appertaining hole $I^2$ or $J^2$ and passage $M^7$ or $M^8$. The several holes $M^6$ are entered by the nozzle $M^5$, each through a washer-like annular plate $M^{10}$, overlying an india-rubber packing $M^{11}$, which is made with a contracted passage $M^{12}$ of less diameter than the said nozzle, as detailed in Fig. 5. The plate $M^{10}$ and packing $M^{11}$ for each hole $M^6$ are tightly fitted into an enlarged portion thereof, and the nozzle $M^5$ is suitably pointed at its lower end that it may be readily forced into the said contracted passage $M^{12}$ of the packing, as shown. Being elastic, this packing closes around the nozzle $M^5$ as it is driven in and keeps the hole $M^6$ receiving it plugged sufficiently to retain the charge of compressed air in this hole $M^6$ and in the thereto-connected retractor hole or holes $I^2$ $J^2$, and thereby enable the compressed air properly to cushion the retractor or retractors which it reaches.
I make use of a dead-block N, Figs. 2 and 3, against which to abut the work when operating thereon with any one of the aforesaid horizontal tools. In making or sharpening drills this dead-block can be brought to bear on either end of the drill-bar, bit, or shank, while the other end, held up by the rests 8 or 9 or equivalent support, is being struck with the horizontal tool-back thereof and the hammer E. The said dead-block is made of iron, preferably, and located to conform with the position of the hammer E in a same vertical plane with this hammer at the right of the operator as he faces the machine. As shown in the said Figs. 2 and 3, it is placed upon suitable guides $N^2$, secured to and projecting forwardly from the front flange $B^2$ of the anvil-block B in a horizontal direction. From these guides the dead-block N rises sufficiently high to afford a bearing, as at $N^3$, for the drill-bar in line with the hammer E and intervening horizontal tool. This bearing $N^3$, as the dotted lines indicate, consists of a conical cavity wherein either end of the drill-bar can be inserted and so held that the opposite end will lie squarely on its rest centered with relation to the horizontal tool and horizontal hammer. The dead-block N is adapted to move back and forth along its guides $N^2$ to accommodate the work, the extent of its movement either way being determined by the greatest length of drill or bar to be forged or shaped, &c. By preference I use water-power where available to advance or retract the said dead-block and maintain it in the required position on its said guides. This is applied as suggested in Figs. 1, 2, and 3. A cylinder $N^4$ is tightly fitted at one end—its inner one—into a suitable hole in the rear of the anvil-block B. This inner end of the cylinder $N^4$ is and remains open. Thence the cylinder $N^4$ extends horizontally outward underneath the hammer E and is suitably supported from the ground at its outer end, which is closed. A piston $N^5$ is placed in the said cylinder $N^4$, and a rod or stem $N^6$, passing through the said inner end of $N^4$, rigidly connects this piston with the dead-block N. The said rod or stem traverses the anvil-block B and runs through a stuffing-box and gland $N^7$ on the front thereof. The cylinder $N^4$ is filled with water on both sides of its piston $N^5$. The water is conveyed to and from this cylinder $N^4$ through pipes $N^8$ $N^9$, connected with its two ends, one to each. $N^8$ reaches the inner end of the cylinder $N^4$ through the right end of the anvil-block B. $N^9$ is attached directly to the cap $N^{10}$, that closes the outer end of the said cylinner $N^4$. These pipes $N^8$ $N^9$ feed and exhaust alternately, as may be required, to cause the piston $N^5$ to move one way or the other with the thereto-connected dead-block N. They therefore are connected both with the water-supply and a discharge through an intermediate four-way cock or rotary valve $N^{11}$. The water supply and discharge are respectively represented by pipes $N^{12}$ $N^{13}$. By referring to Fig. 3, which shows the valve $N^{11}$ in section, it will at once be seen that as there positioned the said valve $N^{11}$ makes a feed-pipe of the pipe $N^8$ and an exhaust-pipe of the pipe $N^9$, which is the right condition to bring about the outward movement of the piston $N^5$, and consequent inward movement of the dead-block N. The reverse will take place by giving the valve $N^{11}$ a quarter-turn, and closing or putting the said valve $N^{11}$ into a neutral position will stop both piston and dead-block. The valve $N^{11}$ is thus worked, as called for, by means of a lever $N^{14}$, standing by the right of the base A and anvil-block B, Fig. 1.

Although my invention is not restricted to the use of any particular motive force for the actuation of the hammers D E, I prefer to operate them by steam or compressed air, the latter being usually employed. The hammers shown, therefore, are of the pneumatic type. As seen in Figs. 1, 2, and 3, the before-mentioned standard $D^2$ of the vertical hammer D rises from the anvil's rear flange $B^3$, to which and the base A it is securely bolted, and it curves forward at the top, so that this hammer may hang over the slidable anvil C and any one among the pairs of vertical tools carried thereby. The horizontal hammer E overlies the water-cylinder $N^4$, above described, and is supported therefrom by means of a bracket $E^2$. Both hammer E and cylinder $N^4$ pass by one side of the standard $D^2$, the latter to reach the anvil-block B and the former to strike the horizontal tool that may be brought before it, and as this standard has some breadth it is notched or cut away at $D^3$ $D^4$ to allow the said hammer E and cylinder $N^4$ to be set closer to the vertical hammer D, so that the several tools on the anvil C need not be spaced wide apart, which obviates making the anvil of unusual or unnecessary length and saves time in turning out the work. These hammers D E, excepting their position, are of identical and well-known construction, and their cylinders are each furnished with an automatic valve O, also of known design and action, save the provision of certain novel means for limiting or checking the movements thereof to regulate the flow of motive fluid, and as a corollary the strength and delivery of the hammer-blows. This description, then, will be limited to setting forth the novelty and utility of these regulating means, and the statements as to the construction or operation of the hammers themselves and their respective valve will be more referential than descriptive, and now to take advantage of the better illustration, and thereby assist in forming a clearer concept of the nature and working of this part of my invention, I shall, in addition to Figs. 1, 2, and 3, also refer to Figs. 7 and 8, which, although representing a modification of my machine, include a vertical hammer (therein marked D') of same construction as D or E and having a like valve O. Assuming, then, that the three hammers D D' E are identical, apart from their position or such immaterial distinction, and have identical though correspondingly-positioned valves O, one to each, and referring to the said Figs. 1, 2, 3, 7, and 8, particularly Fig. 8, which affords the largest sectional view, let us note, first, that each one of the said hammers is directly attached by its helve to a piston P, adapted to reciprocate in a suitably-supported cylinder $P^2$. Next let it be observed that longitudinally of this cylinder, on the face thereof, is secured a valve chest or casing $O^2$, in which is fitted the valve O. Let it be understood also that these parts—valve O, chest $O^2$, piston P, and cylinder $P^2$—are all properly constructed and have the requisite number of ports of suitable form and direction for the induction and eduction of the compressed air or steam, which is supplied through a lateral pipe $O^3$ and exhausted through an oppositely-running pipe $P^3$. It is not necessary to give here a detailed and full statement or illustration of these parts for the reason, above given, that they are borrowed from other extensively-used apparatus—namely, air-actuated hammers and rock-drilling machinery—and no claim is made to the same. Besides, I claim my improved regulating means in connection with any form of automatically-operating valve to which it may be applied. The valve O is held from rotation on its axis by a set-screw $O^4$ passed through the chest $O^2$ and entering a longitudinal groove $O^3$ of this valve, as seen in Fig. 3, or a feather may be used as a substitute for the same purpose. Otherwise the said valve O is perfectly loose and normally would have free longitudinal sliding reciprocatory movement in its casing O², alternately admitting the motive fluid to and exhausting it from the ends of the cylinder P² on either side of the piston P, thereby reciprocating this piston and accordingly working the hammer thereto attached. This movement of valve O is caused by the air or steam pressure, and, as to time, is controlled by and with reference to the moves of piston P. I further control it by means of a pin Q, which enters the end of casing O² nearest the hammer-head through a stuffing-box and gland O⁶. By driving in this pin Q, as in Fig. 1, I bring it into permanent contact with the adjacent end of valve O and push and keep the latter entirely up against the farther end of its casing, with the result that, assuming the motive fluid has been turned on, the hammer attached to the piston P is and remains raised, owing to the induction-ports being and remaining open to the under side of the piston only, as may be seen by reference to Fig. 8. By letting the pin Q down, as in the latter-named figure, the valve O is allowed its normal and fullest movement within the chest O², and the hammer-working piston P moves in accord therewith and with a force proportionate to the air or steam pressure; but by sliding in the pin Q to any position intermediate of these two extremes the range of reciprocation of the valve O will be limited to the same extent and the flow of motive fluid so controlled as to affect in a greater or lesser degree the movement and action of the piston P and thereto-connected hammer. It is apparent that by a judicious handling of this pin Q one may have a perfect command over the hammer, through its valve and piston, and gage or grade the strength and delivery of its blows, from the lighest to the heaviest, in such a way as will best suit the requirements of the work in every instance.

The above-mentioned pin Q is loose, preferably, that it may fall away by gravity from the automatic valve O or be pushed out of contact therewith and let this valve slide up and down or back and forth and perform its work unhindered normally. I hold the said pin Q operably positioned within the end of the chest O² and advance it as required toward or against the valve O by means of a lever and treadle mechanism, the structural details of which vary somewhat according as to whether it is used with the vertical or the horizontal hammer. Figs. 1, 7, and 8 show a convenient form of such mechanism for the vertical hammer D or D', and an equally suitable form of similar mechanism for the horizontal hammer is seen in Figs. 2 and 3. In the case of the vertical hammer D or D', I support the pin Q on the flattened end of a vertically-working horizontally-disposed lever R, which lever is suspended by pivotal connection from a T R² of either the exhaust-pipe P³, Fig. 1, or the supply-pipe O³, Fig. 7, as the lay or construction of the machine will permit. For the horizontal hammer I employ an obliquely-disposed slantingly-working lever R', having also a flattened end that bears on the pin Q, and secured by its other end to a rock-shaft R³, which is suitably supported by brackets R⁴ from the rear of the base A and standard D² or either of them. Two treadles or pedals S S', which may be placed side by side, as in Fig. 2, are provided to work these levers R R', S for R and S' for R'. These treadles or pedals are in hinge connection at one end with a board or plate resting on the ground, as suggested at S², Figs. 6 and 7, and the other end of each is kept down when not in operation by a snap or spring hook S³, fastened to the same board or plate. For a connection between the treadle S and its lever R, I use a rod S⁴, pivotally or flexibly attached to the other end of the latter and similarly attached to the central part of the former, as best seen in Fig. 7. The connecting means for the lever R' and treadle S', as shown in Figs. 2 and 3, comprise an arm S⁵, secured to the hinged end of treadle S', a similar arm S⁶, carried by the rock-shaft R³ of lever R', and an intermediate chain S⁷, suitably led and guided by sheaves S⁸, that are mounted on timbers S⁹, projecting laterally from the base A.

When the loose ends of the treadles are held down, as in Figs. 2 and 6, their levers operate to drive in each its pin Q and stop the valve O, piston P, and hammer D or D' or E, controlled thereby. The reverse condition obtains when either treadle is unhooked and allowed or caused to remain up, as in Fig. 7, since the thereto-connected lever will then release its pin Q, which frees the valve O, piston P, and hammer thereof, (vertical or horizontal, as the case may be,) giving them full play. Now by pressing down with the foot on the unhooked treadle S or S', I am enabled to vary the throw or thrust of the pin Q to limit the movement of the valve O in any required degree, as hereinbefore explained, and thereby produce any desired variation in the motion, action, and effect of the piston P and dependent hammer D, D', or E. Thus it is seen that when I want to use either one of the hammers at any stage of the operation of forging or sharpening I simply release the proper treadle and either leave it fully released or regulate the oscillation thereof to suit with the foot. I find that the treadle in each instance tends upward as soon as released, owing to the action of the compressed air or steam on the valve O, which repels the pin Q and the contacting lever and treadle connections, rendering it unnecessary to apply any force or artificial means to raise or keep up the treadle. I prefer, nevertheless, to furnish each treadle with a spring T to raise it with adequate force when unhooked, and so secure an action that is more uniform and positive. This spring is conveniently made of a curved steel bar, which may be fastened at one end to the board or plate $S^2$ and turned so as to press with its other end against the under side of the treadle, as indicated in Figs. 6 and 7. Fig. 6 shows the said spring T compressed with the treadle $S'$ down under the hook $S^3$. Fig. 7 represents it distended and pushing up the treadle S, which has been disengaged from the hook, presumably by the foot of the operator.

For a brief explanation of the modified form of my machine aforementioned reference will now be made to Figs. 7 to 12, inclusive. This other form, like the form first above described, is an all-round machine capable of doing everything required in drill making or sharpening and similar work. It possesses substantially the same elemental features and general characteristics, the only differences practically being found in the position of its tools, the direction of motion of the anvil carrying the same, and its hammer equipment. Thus the said modified form of my invention comprises a rectangular base or stand $a$, supporting the entire machine; an anvil-block $b$, bolted on the top thereof; an anvil $c$, mounted and movable upon said block $b$; single and double tools, as 4 3 $3^\times$ 5 $5^\times$ 7 $7^\times$, socketed in and movable with said anvil; the before-mentioned hammer $D'$, with which these tools are worked; a dead-block $n$, operated in connection with the single tools, and the necessary apparatus for furnishing, transmitting, and applying such power as may be available to move and stop the anvil, retract the tools, actuate the hammer, set the dead-block, and generally enable the machine to perform the work for which it is designed, all as hereinafter succinctly noted. The base $a$ is composed of stout timbers sunk into the ground to a suitable depth under the machine. Upon this base rests the aforementioned anvil-block $b$, which is a substantially circular casting laterally flanged at the bottom, as at $b^2$ $b^3$, to facilitate its bolting to the said base. This block $b$ has also a central circular upwardly-turned flange $b^4$, fitted in a corresponding recess provided in the bottom of the anvil $c$, which latter caps the said block, bearing upon its upper face and its said flange $b^4$, as seen in Fig. 8. Immediately above its mount, consisting of the base $a$ and flanged block $b$, the anvil $c$ is of about the same shape outwardly as the said block, thence it extends out peripherally and again recedes centerward and upward, so as to afford a commodious annular surface for receiving the above-named bottom tools 3 5 7 and the work, and also to provide room for the superlying top tools $3^\times$, $5^\times$, and $7^\times$, which are suspended from circumferentially-disposed shelves $c^2$, projecting from the upper end of the receding portion of the said anvil. One of these shelves is reserved for the beforementioned single tool 4, (or any other single tool used in lieu thereof,) as in this modified machine all tools are vertically acting, being all worked with the single vertical hammer $D'$. The aforesaid receding portion of the anvil $c$ is made in the form of a tubular bracket, (marked $c^3$ in the drawings,) and through this bracket is passed the cylinder (designated $n^4$) that contains the motive fluid employed for operating the dead-block $n$, which cylinder is similar to the cylinder $N^1$ previously described, and, like it, is screwed at its open inner end into the anvil-block $b$, but runs vertically instead of horizontally. A collar $n'$ is slipped over and firmly secured to the said cylinder $n^4$, directly above and close to the upper central part of the anvil $c$ in order to check any tendency the anvil might have, though heavy, of rocking upon its mount aforesaid, when moving thereon with its tools. As has already been inferred, the anvil $c$ and tools carried thereby partake of a rotary or circular motion when moved upon the block $b$. They are thus moved by means of a stream of water directed through a pipe U against a water-wheel V, which is located in a suitable chamber under the block $b$ and is connected by a train of gearing $V'$ with an internal gear $V^2$, formed in or secured to the anvil $c$ about the base of the flange $b^4$. After having expended its force on the wheel V the water escapes through a pipe $V^3$. The flow of water used for rotating the anvil is controlled by a valve $u$, which is connected with an operating-lever $g$, hereinafter described. The motive medium for operating the hammer and upper tools, preferably compressed air, is admitted from the supply-pipe through pipes $O^3$ and $m$, the former communicating with the cylinder $P^2$, through the valve O, as hereinbefore described, and the latter communicating with the tool-repelling mechanism $I^3$ and K. The tool-repelling mechanism is the same as hereinabove described, except that the passage $M^8$ is omitted and the hole $M^6$ communicates only with the lower end of the hole $I^2$ through the passage $M^7$. The fluid enters the pipe $m$ through a valve $f$, also connected with the operating-lever $g$, above mentioned. The dead-block $n$ is provided at its outer or forward end with a suitable slot for a T-shaped guide $n^2$ in addition to the cavity $n^3$ for the reception of the drill-bar. It is supported and moved up and down by a piston $n^5$ (dotted in Fig. 8) and a rod $n^6$, the piston being driven in the desired direction by the motive fluid, which is introduced to the respective ends of the cylinder $n^4$ through pipes $n^8$ and $n^9$. The outer or upper end of the cylinder is closed by a cap or head $n^{10}$, and the entrance of the fluid to or its exit from the said pipes is controlled by a four-way valve $n^{11}$ and exhaust-pipes $n^{12}$ and $n^{13}$. The aforesaid lever $g$ is mounted at the lower end of a depending portion $g^7$ of a bracket $g^6$, which is secured upon the pipe $N^8$. It is fulcrumed on the projecting end of a rock-shaft $g^5$, which is journaled in the said depending portion $g^7$ and has its opposite end in engagement with the aforementioned valve $u$, through which power is supplied for rotating the anvil. At the lower end of the said lever $g$ and also attached to the rock-shaft $g^5$ is an extension or a supplemental lever $g^9$, which is bifurcated, so as to engage with an arm $g^8$, that projects from the valve $f$, which valve, it has been seen, controls the admission of the motive fluid into the pneumatic or tool-repelling apparatus. The extension $g^9$ is so connected with the lever $g$ that when the lever is moved to the right of the central or vertical position (shown in Fig. 7) to open the valve $u$ and rotate the anvil $c$ the said extension and the valve $f$ will remain stationary; but when the lever is moved to the left of the central position the extension and the valve $f$ will be operated and the anvil-controlling mechanism will stay at rest. The middle portion of the lever $g$ is preferably formed with a transversely-arranged segmental slot $g^3$, through which projects a pin $h'$, provided on the outer end of a stop $h$. The inner end of this stop is adapted to enter recesses $h^2$ in the anvil $c$ and arrest its rotation at any predetermined point, as when the desired tool has been brought under the hammer, there being as many recesses as there are tools. The top of the said inner end of the stop is cut off, so that it can be withdrawn from its recess without pulling away the lower portion from the seat provided therefor in the anvil-block $b$. The stop is mounted with its outer end in the upper part of the aforementioned bracket $g^6$, through which it is adapted to slide, and its inner end is supported by another bracket $h^3$, rigidly secured thereto and slidably mounted on the pipe $n^8$, also before mentioned. A coil-spring $h^4$ surrounds the pipe $n^8$ and bears at its respective ends against the said brackets $g^6$ and $h^3$ and normally impels the stop forward to enter one of the recesses $h^2$ in the anvil when the lever $g$ is returned to its central position after the anvil and the desired tool thereon have been brought into the position required by the operator. By providing the lever with the segmental slot it can be moved to the right or away from the anvil sufficiently to withdraw the stop through engagement of the end of said slot with the pin $h'$ and to open the valve $u$ by means of the rock-shaft $g^5$ to the fullest extent or enough to let the water on in full force to rotate the anvil, and when the anvil has been turned the desired distance—as one-quarter, one-half, or three-quarters—the lever upon being returned to its central or inoperative position will close the valve $u$ and permit the stop being thrown forward into the intended recess. On the other hand, when the lever is swung to the left, or toward the anvil, the pin $h'$ remains stationary, as also the valve $u$; but the extension $g^9$ is oscillated, so as to open the valve $f$ and allow the motive fluid to pass to the hammer and tool operating mechanism. In this manner the mechanism for working the tools and the mechanism for shifting the anvil are controlled entirely independently of each other by the same lever, the central position of the lever rendering both of said mechanisms inoperative.

In making a drill, such as shown at W, Fig. 13, the shank or right-hand end in this figure is formed by means of the double tool 1 and $1^\times$ and the single tool 2, which may properly be termed "shanking-tools" and which respectively fashion the round portion and round end of the drill. These tools are detailed in Figs. 14 to 17, inclusive. The other end of the drill is first subjected to the action of the creasing-tools 3 and $3^\times$, as suggested in Fig. 18, which gives a rear end view of these tools. The same tools are also shown in side elevation at Fig. 19. They form the wings of the drill and, besides, will do other work familiar to any blacksmith. The bit end of the drill is formed by the single-acting tool 4, known as the "dolly," and detailed in Figs. 24 and 25. The trimming of the bit is performed by the tools 5 and $5^\times$, of which Figs. 20 and 21, respectively, give a rear view and a side elevation. Tool 6 (shown only in Fig. 1) is used for upsetting and similar purposes, and the truing or centering of the wings of the bit is effected by the tools 7 and $7^\times$, as indicated in Figs. 22 and 23. When the drill is placed in a vertical position under the dolly, with its lower end resting upon the dead-block, as in the form of my machine last described, instead of horizontally, as in the first-described form, it is then necessary to support its upper end, which may be done, as seen in Figs. 7 and 11, by means of grippers X X, pivotally mounted on the side of the anvil, one on each side of the drill. The upper ends of these grippers are forced into engagement with the drill by two wedge-shaped slides Y Y, suspended from a yoke Y' and fitting between guide-plates or walls Z Z. (See also Fig. 9.) The yoke is connected with the dolly, so as to be drawn upward therewith and force the grippers into engagement with the drill to hold it upright when not held in position by the dolly; but on the descent of the dolly the yoke and wedges are forced downward, which causes the lower ends of the wedges to come into contact with the lower ends X' of the grippers, each of which projects into the path of one of the wedges. This operates to release the upper ends of the grippers from the drill at the instant the blow is struck, and thus the drill is free and in correct position for receiving the blow.

If desired, the pneumatic attachment may be omitted from the dolly, so that it will rest upon the end of the drill at all times, as shown in Figs. 7 and 8, in which case it would hold the drill in an upright position without the use of the grippers. Indeed, my invention in either one of its forms can be operated with or without the use of the tool-repelling mechanism, and such therefore must not be considered an indispensable feature of the invention.

It is understood that in making a number of new drills the shanking and bit-forming constitute two separate operations, each performed continuously on the entire number at different times. When properly managed, these operations are completed each at one heat, and, in fact, a speed of over one drill a minute for each end can be attained by the use of my machine. As to the repair or sharpening of drills that have been used, it is accomplished in a similar manner with some of the same tools and requires no special description.

Having described my invention, I claim—

1. In a machine of the character described, a movable anvil carrying a series of vertically-operated tools, and a series of horizontally-operated tools, means for operating the tools of both series, and means for engaging and holding said anvil stationary in the several positions required for operating the several tools.

2. In a machine of the character described, a movable anvil carrying a series of vertically-operated tools and an alternating series of horizontally-operated tools, means common to each series for operating the tools of the series, means for shifting the anvil to bring any of the tools into operative position, and means for engaging and holding said anvil stationary in the several positions required for operating the several tools.

3. In a machine of the character described, a movable anvil carrying a series of vertically-operated tools and a series of horizontally-operated tools, means common to each series for operating the tools of the series, means for shifting the anvil to bring any of the tools into operative position, and a fluid-operated detent for engaging and holding said anvil stationary in the several positions required for operating the several tools.

4. In a machine of the character described, a movable anvil carrying a series of vertically-operated tools and a series of horizontally-operated tools, means common to each series for operating the tools of the series, a motor for shifting the anvil to bring any of the tools into operative position, a detent for engaging and holding said anvil stationary in the several positions required for operating the several tools, and means for operating said detent and said motor coöperatively, whereby the engaging movement of the detent causes the motor to be stopped.

5. In a machine of the character described, a movable anvil carrying vertically-operated and horizontally-operated tools, means for bringing any of said tools into operative position, means for operating any of said tools, and connected means for engaging and holding said anvil stationary in the several positions required for operating the several tools and simultaneously arresting the motor.

6. In a machine of the character described, a movable anvil carrying vertically-operated and horizontally-operated tools, means for operating any of said tools, a fluid-operated motor for shifting said anvil to bring any of said tools into operative position, a detent for engaging and holding said anvil stationary in the several positions required for operating the several tools, and a lever, connected to operate said detent and at the same time to cut off the fluid-supply from the motor, to arrest the operation thereof.

7. A machine of the character described comprising a base a movable anvil on said base provided with a plurality of tools, means for operating any of said tools, a motor for shifting said anvil, a lever for starting and stopping said motor, a catch on said base arranged to normally engage said anvil and hold the same in a stationary position, and connections between the lever and the catch whereby when the lever is moved to start the motor the catch will be disengaged from the anvil and when the lever is moved to stop the motor the catch will be caused to again engage the anvil and lock the same in position.

8. A machine of the character described comprising a base, a movable anvil on said base provided with a plurality of tools, means for operating any of said tools, a fluid-operated motor for shifting said anvil, a pipe for supplying fluid to said motor, a valve in said pipe, an operating-lever for said valve, a fluid-operated catch on the base normally engaging the anvil, and a connection between the lever and the catch whereby when the lever is moved to admit the fluid to the motor it will engage the catch and withdraw it from engagement with the anvil and when the lever is moved to cut off the supply of fluid to the motor it will be disengaged from the catch and allow the same to be forced by fluid-pressure into engagement with the anvil.

9. In a machine of the character described, a movable anvil provided with a plurality of movable tools, means for operating any of said tools, a tool-repelling device for each tool, and means whereby when the anvil is moved to bring any desired tool under the operating means, the repelling device of that particular tool will be operated to raise said tool.

10. In a machine of the character described, a movable anvil provided with a plurality of movable tools, means for operating any of said tools, a fluid-actuated repelling device for each tool, and means whereby when the anvil is moved to bring any particular tool under the operating means, fluid will be automatically admitted to the repelling device of that tool to raise said tool.

11. In a machine of the character described, a movable anvil carrying a series of vertically-operated and a series of horizontally-operated tools, separate hammers for operating the vertically-operated and the horizontally-operated tools, means for shifting the anvil to bring any of the tools into operative position, means for engaging and holding said anvil stationary in the several positions required for operating the several tools, and means for holding the hammer which operates either series positively out of action while the hammer which operates the other series is in action.

12. In a machine of the character described, a recessed movable anvil provided with a plurality of tools, a portion of which tools are movable, means in said recesses for engaging with the movable tools, and means for introducing a fluid medium in said recesses for actuating said tool-engaging means, substantially as set forth.

13. In a machine of the character described, a movable anvil provided with stationary and movable tools and chambers adjacent to the movable tools, plungers in said chambers for moving said tools, and means for introducing a fluid medium under said plungers, substantially as set forth.

14. In a machine of the character described, a movable anvil provided with movable tools and a hole adjacent to each tool, a plunger in each hole, a pin in the shank of each tool for engaging with its respective plunger, and means for forcing air under each plunger, substantially as set forth.

15. In a machine of the character described, a movable anvil provided with movable tools and a hole adjacent to each tool, a plunger in each hole having its inner end recessed and its outer end provided with a head to rest on the anvil, a pin in the shank of each tool for being engaged by its respective plunger, and means for introducing compressed air into each hole below its plunger, substantially as set forth.

16. In a machine of the character described, a movable anvil provided with movable tools and means for holding them outward, a passage in the anvil for each holding means, the outer end of which passage is provided with an elastic packing, and a pipe for projecting through said packing and supplying compressed air to said tool-holding means, substantially as set forth.

17. In a machine of the character described, a movable anvil provided with movable tools and means for holding them outward, a passage in the anvil for each holding means, and an automatically-reciprocating pipe for entering any one of said passages and supplying compressed air thereto and to said means, substantially as set forth.

18. In a machine of the character described, a movable anvil provided with movable tools and a tool-repelling device for each tool, a pipe, a reciprocatory nozzle therein provided with a head, a spring under the head, and means for supplying air under pressure to said pipe and nozzle and causing them to automatically establish communication with the tool-repelling device, substantially as set forth.

19. In a machine of the character described, a base, a movable anvil on said base provided with a plurality of movable tools, means for operating any of said tools, a cylinder secured to the anvil, a hollow pipe secured to the base and passing through said cylinder, a piston secured to said hollow pipe within the cylinder and means for admitting a fluid from said pipe to either side of said piston to cause the anvil to move on the base.

20. In a machine of the character described, a base, a movable anvil on said base provided with a plurality of vertically-disposed tools and a plurality of horizontally-disposed tools, a vertically-disposed hammer and a horizontally-disposed hammer secured to said base, and means for shifting said anvil whereby a vertical tool will be brought into an operative position with relation to the vertical hammer and a horizontal tool with relation to the horizontal hammer.

In testimony whereof I have signed my name to this specification in the presence of two subscribing witnesses.

JOHN B. WORD. [L. S.]

Witnesses:
  A. H. STE. MARIE,
  GEO. T. KNOX.